(12) United States Patent
Bauer

(10) Patent No.: US 6,216,973 B1
(45) Date of Patent: *Apr. 17, 2001

(54) ELECTRIC LOCKING SEAT BELT RETRACTOR

(75) Inventor: Barney J. Bauer, Fenton, MI (US)

(73) Assignee: TRW Vehicle Safety Systems Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/178,394

(22) Filed: Oct. 23, 1998

(51) Int. Cl.[7] ............................................ B60R 22/40
(52) U.S. Cl. ...................... 242/384; 242/384.3; 280/807
(58) Field of Search .............................. 242/384, 384.3, 242/384.5, 384.6; 280/806, 807; 297/476, 478

(56) References Cited

U.S. PATENT DOCUMENTS

| 4,363,991 | 12/1982 | Edelman | 310/316 |
|---|---|---|---|
| 4,729,525 | 3/1988 | Rumpf | 242/383.4 |
| 4,854,424 | * 8/1989 | Yamatoh et al. | 188/72.1 |
| 4,895,317 | 1/1990 | Rumpf et al. | 242/383.4 |
| 5,206,557 | 4/1993 | Bobbio | 310/309 |
| 5,377,802 | * 1/1995 | Ide | 192/107 C |
| 5,479,061 | 12/1995 | Bobbio et al. | 310/309 |
| 5,642,015 | 6/1997 | Whitehead et al. | 310/309 |
| 5,826,683 | * 10/1998 | Murata et al. | 188/161 |

* cited by examiner

Primary Examiner—John Q. Nguyen
(74) Attorney, Agent, or Firm—Tarolli, Sundheim, Covell, Tummino & Szabo L.L.P.

(57) ABSTRACT

A seat belt retractor (10) including a seat belt webbing spool (24) supported for rotation in a belt withdrawal direction (29) and an opposite belt retraction direction (30). A member (40) is supported for rotation relative to the spool (24). The retractor (10) includes means for blocking rotation of the spool (24) in the belt withdrawal direction (29) in response to relative rotation of the member (40) and the spool. The retractor (10) also includes an electrically actuatable clamp (48, 80) movable, upon application of an electric current, between a first condition not clamping the member (40) and a second condition clamping the member and thereby restraining rotation of the member.

11 Claims, 2 Drawing Sheets

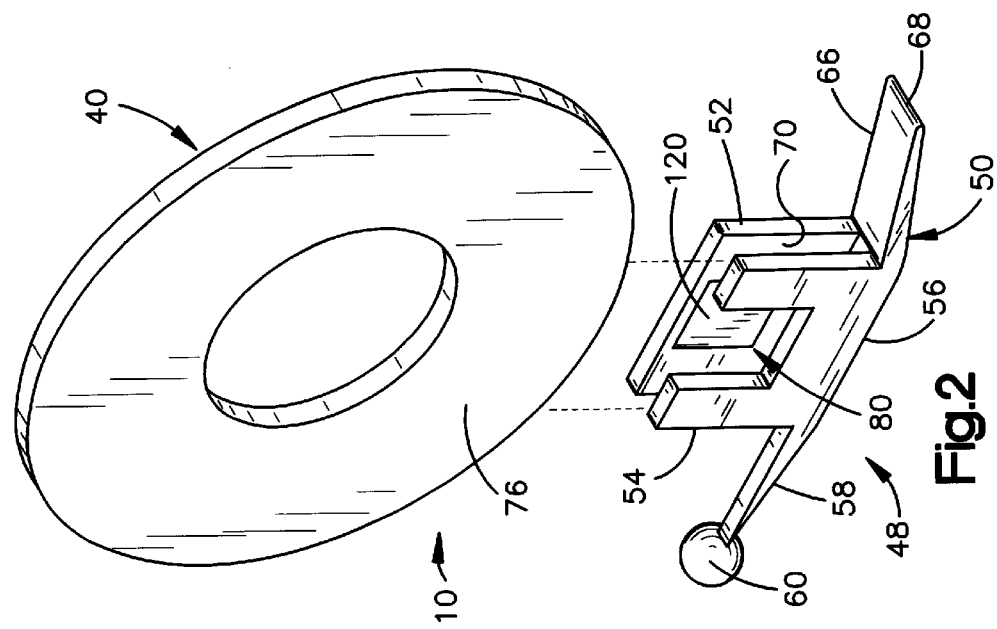
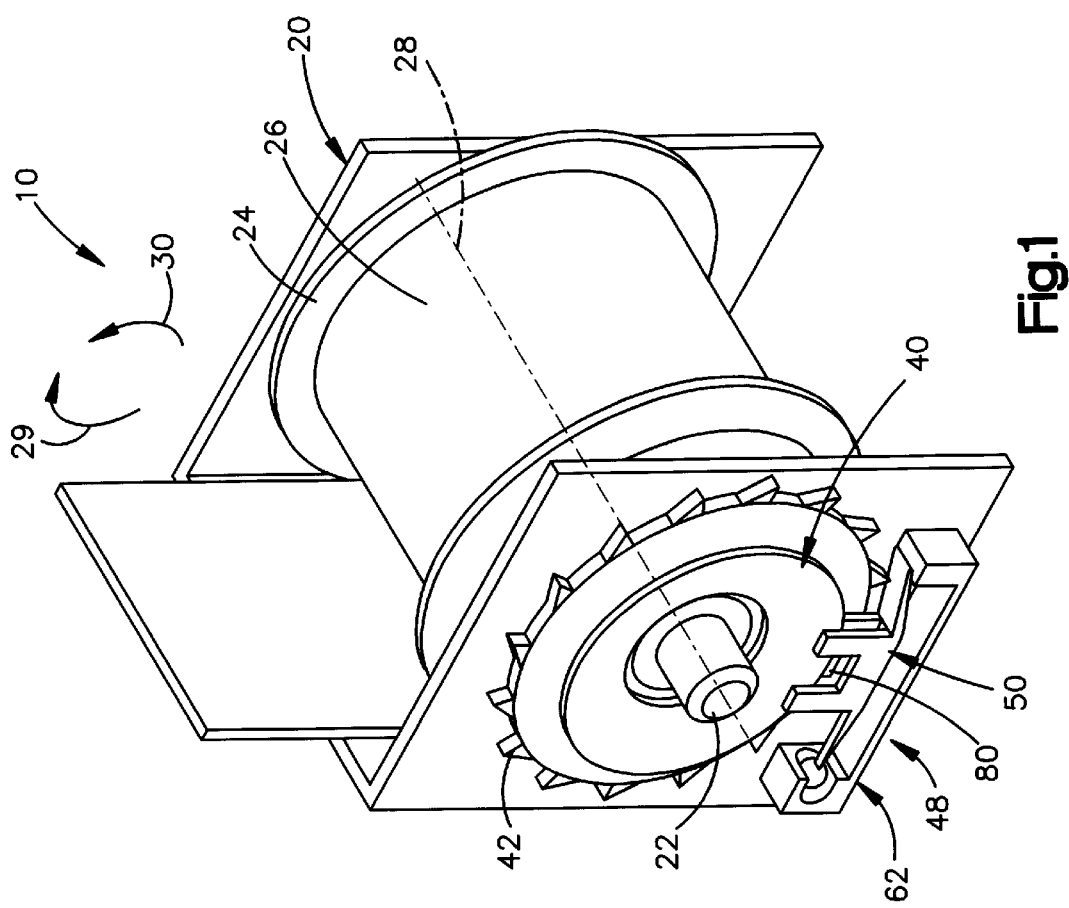

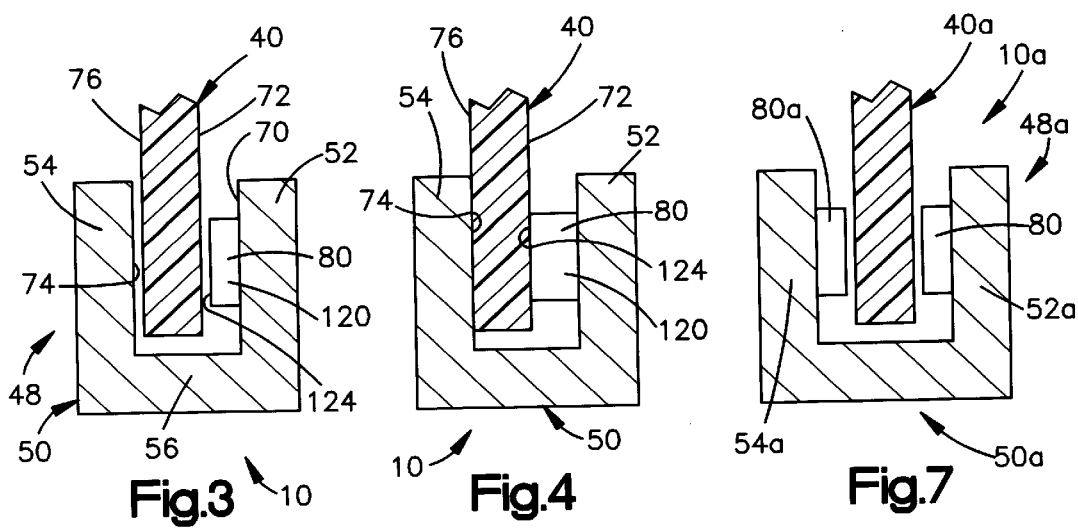
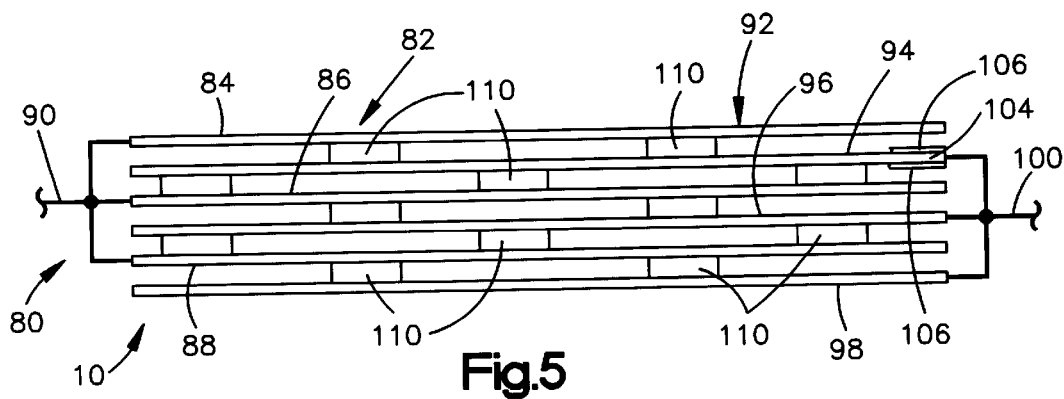
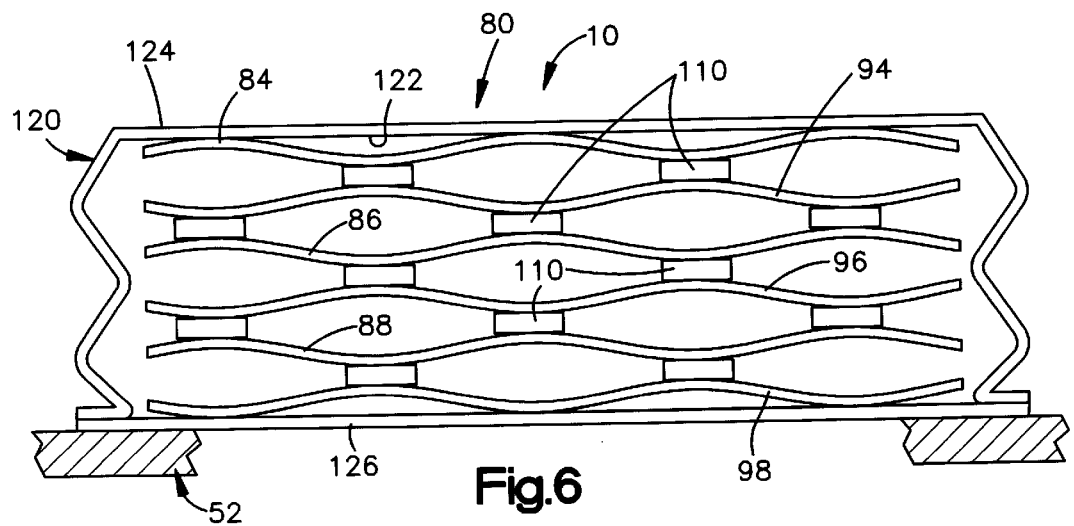

ELECTRIC LOCKING SEAT BELT RETRACTOR

TECHNICAL FIELD

The present invention relates to a seat belt retractor, and particularly relates to an electrically lockable seat belt retractor.

BACKGROUND OF THE INVENTION

A vehicle seat belt retractor includes belt webbing wound on a spool of the retractor. A spool locking mechanism blocks withdrawal of seat belt webbing from the spool to help protect a vehicle occupant in the event of a vehicle collision. In some seat belt retractors, the spool locking mechanism is electrically actuated. To actuate the spool locking mechanism, a sensor senses a condition indicative of a vehicle collision and a controller sends an electrical signal to the retractor. In one known retractor, the electrical signal actuates an electromagnet which causes a pawl to move into engagement with a ratchet wheel on the retractor. In another known retractor, the actuation of an electromagnet creates a magnetic attractive force to restrain rotation of a magnetic disc and thereby to actuate the spool locking mechanism of the retractor.

U.S. Pat. Nos. 4,363,991, 5,206,557 and 5,642,015 disclose micro electro-mechanical transducers. These transducers are small devices which are capable of transforming a small electric current into mechanical motion.

SUMMARY OF THE INVENTION

The present invention is a seat belt retractor comprising a seat belt webbing spool supported for rotation in a belt withdrawal direction and an opposite belt retraction direction. A member is supported for rotation relative to the spool. The retractor includes means for blocking rotation of the spool in the belt withdrawal direction in response to relative rotation of the member and the spool. The retractor also includes an electrically actuatable clamp movable upon application of an electric current between a first condition not clamping the member and a second condition clamping the member and thereby restraining rotation of the member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a perspective view of a seat belt retractor constructed in accordance with the present invention;

FIG. 2 is an enlarged fragmentary perspective view of the retractor of FIG. 1;

FIG. 3 is a sectional view of portions of the retractor of FIG. 1 shown in a first condition;

FIG. 4 is a view similar to FIG. 3 showing the retractor portions in a second condition;

FIG. 5 is a schematic illustration of an integrated force array which forms part of the retractor of FIG. 1, shown in a first condition;

FIG. 6 is a view similar to FIG. 5 showing the integrated force array in a second condition; and FIG. 7 is a view similar to FIG. 3 showing a seat belt retractor constructed in accordance with a second embodiment of present invention.

DESCRIPTION OF PREFERRED EMBODIMENTS

The present invention relates to an electrically lockable seat belt retractor. The present invention is applicable to various seat belt retractors and systems. As representative of the invention, FIG. 1 illustrates schematically a retractor 10 which forms part of a three-point continuous loop seat belt system (not shown) for use in helping to protect an occupant of a vehicle.

The seat belt retractor 10 has a generally U-shaped metal frame 20 (FIG. 2) which is secured to the vehicle body in a manner not shown. A shaft 22 is supported for rotation on the frame 20. A seat belt webbing spool 24 is fixed for rotation with the shaft 22 relative to the frame 20. A length of seat belt webbing 26 is wound on the spool 24.

The spool 24 is rotatable about an axis 28 in a belt webbing withdrawal direction 29 and an opposite belt webbing retraction direction 30. The seat belt retractor 10 further includes a rewind spring (not shown) which acts between the frame 22 and the seat belt webbing spool 24 to bias the spool to rotate in the belt webbing retraction direction 30.

The retractor includes a rotatable member or inertia disc 40 which is supported for rotation about the axis 28. The inertia disc 40 is, in a known manner not shown, coupled for rotation with the spool 24. Specifically, the inertia disc 40 is rotatable with the spool 24 when the spool 24 is not accelerating at a rate above a predetermined rate. The inertia disc is rotatable relative to the spool when the spool accelerates at a rate above the predetermined rate. In the event of relative rotation of the inertia disc 40 and the spool 24, a known locking mechanism of the retractor 10, including a ratchet wheel 42, blocks rotation of the spool in the belt withdrawal direction 29. Thus, the retractor 10 is a "web sensitive" type of retractor, in which spool locking occurs as a result of a webbing event.

The retractor 10 is also a "vehicle sensitive" type of retractor, in which spool locking occurs as a result of a vehicle event such as sudden vehicle deceleration that is caused by a collision. Specifically, the retractor 10 includes a clamp 48 for restraining the inertia disc 40 to effect relative rotation of the disc and the spool 24 in the event of sudden vehicle deceleration such as occurs in a collision.

The clamp 48 includes a housing 50 (FIGS. 1 and 2). The housing 50 has a generally U-shaped configuration including inner and outer arms 52 and 54 which extend on opposite sides of the inertia disc 40. The inertia disc 40 is rotatable through the space between the inner and outer arms 52 and 54 of the housing.

The inner and outer arms 52 and 54 of the housing 50 are joined at their lower ends by a connector portion 56 of the housing to provide the U-shaped configuration of the housing. A first support arm 58 of the housing 50 extends from one side of the connector portion 56 and terminates in a pivot joint 60. The pivot joint 60 includes a ball supported for rotational movement in a bracket 62 fixed to the frame 20. The pivot joint 60 allows a small amount of radial and axial movement of the housing 50 relative to the inertia disc 40.

A second support arm 66 of the housing 50 extends from the connector portion 56 in a direction opposite the first support arm 58. The second support arm 66 has an end portion 68 which is supported on the bracket 62. The engagement of the second support arm 66 with the bracket 62 limits radial movement of the housing 50 in a direction away from the axis 28.

The inner arm 52 of the housing 50 (FIG. 3) has an axially outer side surface 70 which is presented toward an axially inner side surface 72 of the inertia disc 40. The outer arm 54 of the housing 50 has an axially inner side surface 74 which is presented toward an axially outer side surface 76 of the inertia disc 40. The side surfaces 70 and 74 of the housing 50 thus face each other, on opposite sides of the inertia disc 40.

The clamp 48 also includes an actuator pad 80 disposed on the outer side surface 70 of the inner housing arm 52. The actuator pad 80 is an electrically actuatable device of the type generally known as an integrated force array. The actuator pad 80 is enclosed in a pad casing 120 described below.

The actuator pad 80 includes a plurality of electrically chargeable strips or plates. A first set 82 of first plates 84, 86 and 88 is connected with one lead wire 90. A second set 92 of second plates 94, 96 and 98 is interleaved with the first set 82 of first plates 84–88. The second set 92 of second plates 94–98 is connected with a second lead wire 100.

All of the plates 84–88 and 94–98 are similar in construction. Therefore, only the plate 94, which is exemplary, is described in detail. In the illustrated embodiment, the plate 94 is made from a polyimide substrate 104 which is flexible and resilient. A metallic coating 106 (a portion of which is shown in FIG. 5, exaggerated in thickness for clarity) is adhered by deposition on both sides of the substrate 104. As a result, the plate 94 is capable of accepting and retaining an electric charge. The metallic coating 106 is deposited in a very thin layer and is flexible with the substrate 104.

The actuator pad 80 also includes a plurality of identical spacers 110. The spacers 110 are preferably made of the same polyimide material which is used to make the substrates 104 of the plates 84–88 and 94–98. The spacers 110 are disposed between and thus keep separate adjacent plates in the actuator pad 80. The spacers 110 also secure adjacent plates to each other. The dimensions of the spacers 110 are selected so that adjacent plates, when energized electrically as described below, can flex toward each other without touching each other.

The outermost plate 84 of the actuator pad 80 is spaced farthest from the inner housing arm 52. The outermost plate 84 is fixed to an inner side surface 122 of an outer wall 124 of the pad casing 120. The outer wall 124 is presented toward and is engageable with the axially inner side surface 72 of the inertia disc 40. The outer wall 124 is configured as a friction surface for retarding movement of the rotating inertia disc 40 upon engagement with the inertia disc as described below.

The innermost plate 98 of the actuator pad 80 is closest to the inner housing arm 52. The innermost plate 98 is fixed to an inner wall 126 of the pad casing 120. The inner wall 126 of the pad casing 120 is fixed to the inner housing arm 52. The actuator pad 80 is thus supported on the inner housing arm 52 in position adjacent to the inertia disc 40.

The dimensions of the housing 50 and the actuator pad 80 are selected so that the outer wall 124 of the actuator pad casing 120 does not normally contact the inertia disc 40. Specifically, the axial thickness of the actuator pad 80 and casing 120, together with the axial thickness of the inertia disc 40, is slightly less than the axial distance between the facing outer and inner side surfaces 70 and 74 of the housing 50. There is normally a slight axial clearance between the axially inner side surface 72 of the inertia disc 40 and the outer wall 124 of the actuator pad casing 120. Similarly, there is normally a slight axial clearance between the axially outer side surface 76 of the inertia disc 40 and the inner side surface 74 of the outer housing arm 54. In one exemplary retractor 10, the actuator pad 80 may have a thickness of about 0.025" when in the unactuated condition, and a thickness of about 0.029–0.030" when actuated.

The lead wires 90 and 100 are connected with vehicle electric circuitry (not shown) including a power source, which is preferably a vehicle battery and/or a capacitor, and a normally open switch. The switch is part of a sensor which senses a vehicle condition indicating the occurrence of a collision. The collision-indicating condition may comprise, for example, sudden vehicle deceleration that is caused by a collision. If the collision-indicating condition is at or above a predetermined threshold level, this indicates the occurrence of a crash having a level of severity for which it is desirable to block withdrawal of belt webbing 26 from the retractor 10 to help protect an occupant of the vehicle.

When the sensor senses a collision-indicating condition at or above the predetermined threshold level, the switch closes and an electric current flows over the lead wires 90 and 100 to the actuator pad 80. The actuator pad 80 is actuated electrically.

The electric current flows through both lead wires 90 and 100 in the same direction, thereby to cause both the first plates 84–88 and the second plates 94–98 to have the same electric charge. For example, both the first plates 84–88 and the second plates 94–98 may be charged with a positive electric charge. The first and second plates 84–88 and 94–98, when identically charged in this manner, repel each other. The plates 84–88 and 94–98 flex and the actuator pad 80 moves from the unactuated condition shown schematically in FIG. 5 to the actuated condition shown schematically in FIG. 6.

As the actuator pad 80 attains the actuated condition, the actuator pad becomes thicker. Specifically, as the first and second plates 84–88 and 94–98 repel each other and flex, the outermost plate 84 of the actuator pad 80 moves away from the inner housing arm 52. The outer wall 124 of the actuator pad casing 120, which is movable with the outermost plate 84, is moved into engagement with the axially inner side surface 72 of the inertia disc 40.

The engagement of the outer wall 124 of the actuator pad casing 80 with the axially inner side surface 72 of the inertia disc 40 causes the inertia disc to move axially into engagement with the axially inner side surface 74 of the outer housing arm 54. As a result, a clamping force, directed between the inner and outer arms 52 and 54 of the housing 50, is exerted on the inertia disc 40. This clamping action restrains rotation of the inertia disc 40. If belt webbing 26 is attempted to be withdrawn from the spool 24, relative rotation occurs between the inertia disc 40 and the spool. This relative rotation actuates the locking mechanism of the retractor 10 and blocks rotation of the spool 24 in the belt withdrawal direction 29. No other electrical devices, such as relays, electromagnets, solenoids, are needed to initiate locking of the retractor 10.

FIG. 7 illustrates a portion of a seat belt retractor 10a constructed in accordance with a second embodiment of the present invention. The retractor 10a is generally similar in construction to the retractor 10 (FIGS. 1–6), and parts which are the same or similar are given the same reference numerals with the suffix "a" added for clarity.

The clamp 48a of the retractor 10a includes a second actuator pad 80a fixed to the axially inner side surface 74 of the outer housing arm 54. The second actuator pad 80a is electrically energizable simultaneously with the actuator pad

80. When the actuator pads 80 and 80*a* are energized, both pads increase in thickness axially toward the inertia disc 40. The inertia disc is clamped between the two actuator pads 80 and 80*a*, rather than being clamped between one actuator pad and a housing arm.

In a third embodiment of the present invention, the actuator pad 80 is a piezoelectric device rather than an integrated force array. The piezoelectric device, when activated by the flow of electric current, changes dimensions in a known manner to become thicker axially. The piezoelectric actuator pad can be substituted in either of the retractors 10 or 10*a*, in place of an integrated force array actuator pad.

From the above description of the invention, those skilled in the art will perceive improvements, changes and modifications in the invention. Such improvements, changes and modifications within the skill of the art are intended to be covered by the appended claims.

Having described the invention, I claim:

1. A seat belt retractor comprising:
    a seat belt webbing spool supported for rotation in a belt withdrawal direction and an opposite belt retraction direction;
    a member supported for rotation relative to said spool;
    means for blocking rotation of said spool in the belt withdrawal direction in response to relative rotation of said member and said spool;
    an electrically actuatable clamp movable upon application of an electric current between a first condition not clamping said member and a second condition clamping said member and thereby restraining rotation of said member; means for mounting said clamp; and
    two actuator pads separated by said member and mounted on said clamp, said actuator pads each changing thickness in response to the flow of electric current through said actuator pads to abut opposite sides of said member and to apply damping force against each of said opposite sides of said member,
    said clamp being adapted to move axially and compensate for non-uniform changes in thickness of said actuator pads.

2. A retractor as set forth in claim 1 wherein said clamp comprises an integrated force array.

3. A retractor as set forth in claim 2 wherein said integrated force array comprises a plurality of electrically chargeable plates including at least two adjacent plates which are connectable with vehicle electric circuitry for receiving an electric charge of the same polarity and thereby causing said at least two adjacent plates to repel each other.

4. A retractor as set forth in claim 1 wherein said member has an annular outer edge portion rotatable through a space between said actuator pads, said actuator pads changing thickness in response to the flow of electric current through said actuator pads and thereby moving into engagement with said member to restrain rotation of said member.

5. A retractor as set forth in claim 4 wherein said actuator pads comprise integrated force arrays.

6. A retractor as set forth in claim 1 wherein said member has first and second opposite sides, one of said actuator pads being engageable with said first side of said member, and the other of said actuator pads being engageable with said second side of said member.

7. A seat belt retractor comprising:
    a seat belt webbing spool supported for rotation in a belt withdrawal direction and an opposite belt retraction direction;
    a member supported for rotation relative to said spool;
    means for blocking rotation of said spool in the belt withdrawal direction in response to relative rotation of said member and said spool;
    a clamping portion spaced axially away from said member; means for mounting said clamping portion and
    an actuator pad mounted on said clamping portion, said actuator pad changing thickness in response to the flow of electric current through said actuator pad, said actuator pad being supported adjacent to said member, said actuator pad having a first condition not restraining rotation of said member and a second condition in engagement with said member and thereby restraining rotation of said member,
    said clamping portion being movable axially relative to said member.

8. A retractor as set forth in claim 7 wherein said actuator pad comprises an integrated force array including at least two electrically chargeable plates which are connectable with vehicle electric circuitry for receiving an electric charge of the same polarity and thereby causing said at least two plates to repel each other.

9. A retractor as set forth in claim 8 wherein said member has an annular outer edge portion rotatable through a space between axially spaced clamping portions of said actuator pad, said clamping portions including said integrated force array, said integrated force array increasing in thickness in response to the flow of electric current through said integrated force array and thereby moving into engagement with said outer edge portion of said member to restrain rotation of said member.

10. A seat belt retractor comprising:
    a seat belt webbing spool supported for rotation in a belt withdrawal direction and an opposite belt retraction direction;
    a member supported for rotation relative to said spool, said member being rotatable through a space between axially spaced first and second clamping portions, and a means for mounting said second clamping portion,
    said first clamping portion comprising an actuator pad which changes thickness in response to the flow of electric current through said actuator pad,
    said actuator pad being engageable with a first side of said member, said second clamping portion being engageable with a second side of said member, said second side of said member being opposite said first side of said member,
    said second clamping portion being movable axially relative to said member in response to the change in thickness of said actuator pad so that both said actuator pad and said second clamping portion engage and clamp against said member.

11. A retractor as set forth in claim 10 wherein said actuator pad comprises an integrated force array.

* * * * *